United States Patent
McKown et al.

(10) Patent No.: US 9,746,968 B1
(45) Date of Patent: Aug. 29, 2017

(54) TOUCH SCREEN DISPLAY WITH TACTILE FEEDBACK USING TRANSPARENT ACTUATOR ASSEMBLIES

(75) Inventors: Russell C. McKown, Richardson, TX (US); David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 333 days.

(21) Appl. No.: 13/293,686

(22) Filed: Nov. 10, 2011

Related U.S. Application Data (60) Provisional application No. 61/412,171, filed on Nov. 10, 2010.

(51) Int. Cl.
| | | |
|---|---|---|
| G06F 3/045 | (2006.01) | |
| A63F 9/24 | (2006.01) | |
| G06F 3/044 | (2006.01) | |
| G06F 3/01 | (2006.01) | |

(52) U.S. Cl.
CPC .............. *G06F 3/044* (2013.01); *G06F 3/016* (2013.01)

(58) Field of Classification Search
CPC .......... G06F 3/041; G06F 3/044; G06F 3/045; G06F 3/016; G06F 3/046; G06F 3/047
USPC ................... 345/173–174; 178/18.01–20.04; 340/407.1–407.2
See application file for complete search history.

(56) References Cited

U.S. PATENT DOCUMENTS

| | | |
|---|---|---|
| 6,555,945 B1 | 4/2003 | Baughman et al. |
| 7,663,607 B2 | 2/2010 | Hotelling et al. |
| 2001/0035854 A1* | 11/2001 | Rosenberg et al. ........... 345/156 |
| 2002/0149561 A1* | 10/2002 | Fukumoto .......... G01C 21/3664 345/156 |
| 2005/0057528 A1* | 3/2005 | Kleen ........................... 345/173 |
| 2008/0158178 A1 | 7/2008 | Hotelling et al. |
| 2009/0109007 A1 | 4/2009 | Makinen et al. |
| 2009/0115734 A1* | 5/2009 | Fredriksson et al. ......... 345/173 |
| 2009/0156818 A1 | 6/2009 | Wang et al. |
| 2009/0167704 A1 | 7/2009 | Terlizzi et al. |
| 2010/0080975 A1 | 4/2010 | Liang et al. |
| 2010/0123685 A1 | 5/2010 | Lee et al. |
| 2010/0152794 A1 | 6/2010 | Radivojevic et al. |

(Continued)

FOREIGN PATENT DOCUMENTS

WO    WO/2010/038466    8/2010

OTHER PUBLICATIONS

Michael Kwan, "Pros and Cons of Touchscreen Cell Phones", Mobile Magazine, Aug. 14, 2008, http://www.mobilemag.com/2008/08/14/pros-and-cons-of-touchscreen-cell-phones-feature/.

(Continued)

*Primary Examiner* — Hang Lin
(74) *Attorney, Agent, or Firm* — Haynes and Boone, LLP (57) ABSTRACT

The present invention provides a module or system and a method that includes: 1) a transparent screen assembly containing an actuator layer lying between two layers of transparent multiple line electrodes, where one electrode layer of forms lines in the x-direction layer and the other electrode layer forms lines in the y-direction; and 2) a controller that is connected to these electrodes. The system and method of the present invention provides: 1) multiple touch sensing on or near a surface of the transparent screen and 2) simultaneous high resolution tactile feedback across the same surface.

14 Claims, 7 Drawing Sheets

(56) References Cited

U.S. PATENT DOCUMENTS

2010/0156818 A1    6/2010  Burrough et al.

OTHER PUBLICATIONS

Matt Braga, "How Haptic Feedback Brings Sensation to Touchscreens", Tested.com, May 25, 2010, http://www.tested.com/news/how-haptic-feedback-brings-sensation-to-touchscreens/336/.
Gary Barret and Ryomei Omote, "Projected-Capacitive Touch Technology", Touch Technology Issue, Information Display, Mar. 2010, pp. 16-21, vol. 26, No. 4.
Bong Sup Shim, et als., "Transparent Conductors from Layer-by-Layer Assembled SWNT Films: Importance of Mechanical Properties and a New Figure of Merit", American Chemical Society, Nano, Jun. 2010, pp. 3725-3734; vol. 4, No. 7.
Sumio Iijima, "Helical microtubules of graphitic carbon", Nature, Nov. 7, 1991, pp. 56-58, vol. 354, No. 7.
I.A. Levitsky, et al., "Electromechanical actuation of composite material from carbon nanotubes and ionomeric polymer", J. Chem. Phys., Jul. 8, 2004, p. 1058, vol. 121, No. 2.
B. Stumpe and C. Sutton, "The first capacitive screens at CERN", CERN Courier, Mar. 31, 2010.

* cited by examiner

FIG. 10

TOUCH SCREEN DISPLAY WITH TACTILE FEEDBACK USING TRANSPARENT ACTUATOR ASSEMBLIES

CROSS-REFERENCE TO RELATED APPLICATIONS

The instant application claims priority to provisional application No. 61/412,171, filed Nov. 10, 2010, entitled "Multiple Touch Screen with Tactile Feedback Using Transparent Actuator Assemblies", the entire contents of which are incorporated by reference herein.

FIELD OF THE INVENTION

The present patent disclosure relates to a touch screen for a display device and, more particularly, to a touch screen that is capable of both multiple touch sensing and high resolution tactile feedback.

BACKGROUND OF INVENTION

The touch screen of the Apple iPhone is recognized as a user interface breakthrough and, at least at the time of the device's introduction in 2007, was seen as somewhat radical in that the iPhone does not have any keypad or keyboard at all. The new multi-touch screen could detect multiple fingers touching the screen, was well integrated into the phone's operating system and featured in many applications. Regarding the absence of a keyboard, the market success of the iPhone demonstrates a form of market acceptance of requiring the user to enter phone numbers by touching a flat screen's displayed keypad or to enter text by typing on a displayed QWERTY keyboard. However, typing on an image of a QWERTY keyboard displayed on a flat surface is generally considered to be somewhat problematic when compared to using a real keyboard.

As discussed by Michael Kwan, *Pros and Cons of Touchscreen Cell Phones, Mobile Magazine*, August 2008, the absence of tactile feedback is a problem:

"There's just something to be said about hitting a physical button. For the life of me, I just can't type as fast on something like the Samsung Instinct or Apple iPhone as I can on something with a physical QWERTY keyboard like the LG enV2 or HTC Touch Pro. I also find that it's a lot easier dialing on a conventional numeric keypad than it is on a virtual keypad. Some handsets have tried to rectify this with haptic feedback, but it's just not the same."

The author goes on to point out that 'having to look to touch' is a definite additional safety issue if a cell phone user is driving a motor vehicle and that a main attraction of a button on a 'regular phone' is that you know you pressed it.

More recently, Matt Braga in "How Haptic Feedback Brings Sensation to Touchscreens", Tested, May 2010, speaks similarly to the touch screen typing problem then surveys today's attempts at a solution:

"It's for that reason that haptic feedback technology has become all the rage in recent years. Usually with the aid of a motor, haptic feedback aims to simulate the feeling of physical interaction while using a touch screen device. We've seen companies like RIM implement the technology with their Storm line of BlackBerries, while Motorola devices like the Droid have followed a similar approach. However, none of them feel quite right, so to speak. A vibration does little to simulate so-called 'natural' interaction, and that's a problem the latest haptic feedback technology is hoping to fix. The problem, however, is that the resulting vibrations are far from precise. Anything you touch seems to produce a similar, repetitive result, doing little to replicate the tactile sensation of a physical input."

Toshiba's plan, announced May 2010, is to use Senseg's electrical haptic technology which modulates an electrical field to directly stimulate the touch sensors in the user's fingers. This approach is not only described in U.S. Patent Application 2009/0109007 assigned to Senseg a Finnish company founded in 2006, but also, in U.S. Patent Application 2010/0152794 assigned to Nokia, another Finnish company. The primary problem with this direct stimulation of the touch receptor approach is making the sensation that it produces recognizable to the user, for example like the feeling of a key on a keyboard.

Inventive efforts at Apple Inc. on haptic feedback for touch screens are evident in published U.S. Patent Applications 2009/0156818 and 2010/0156818. The latter application, Multi Touch with Multi Haptics, employs a phased array of haptic actuator/vibrators to create localized vibration feedback that appears to be an advance in comparison to the non-localized motor generated vibration feedback described above, but retains the problem of being a vibration. The former application, Multi-touch Display Localized Tactile Feedback, is closest to the present invention but focuses on how an application program would use such a technology with little contribution to actually creating the technology.

What is needed is a multiple touch screen with a dynamic tactile surface that can provide haptic feedback of sufficient fidelity that, for example, it can replicate the experience of using a physical keyboard. A transparent multi-touch sensing and tactile feedback screen assembly and an associated controller are desired that together are capable of providing both multi-touch input and local tactile response. Given the existing mutual capacitance technology for multiple touch detection and given the emerging capacitance-based technology of carbon nanotube actuators, what is needed is a means for combing the two technologies to provide a multi-touch screen with tactile feedback. Both of these technologies either use, or can use, a grid of x and y line electrodes in the screen assembly to provide localization. As a consequence, a specific need is for a touch and tactile screen controller system and method that allow the x and y line electrodes that are used for multi-touch sensing to also and simultaneously be used for localized actuator-based tactile feedback.

SUMMARY OF INVENTION

The present invention provides a module or system and a method that uses an assembly containing multiple electrodes that act as both sensors and actuators to provide a multi-touch screen with a dynamic tactile surface. Prior art multi-touch screen controllers are not concerned with simultaneously exciting actuators that produce a dynamic tactile surface. The present invention provides a transparent multi-touch sensing and tactile feedback screen assembly and an associated controller that provide both the desired multiple touch sensing input and the desired tactile feedback response. An example embodiment of the present invention may include a method of detecting user initiated touch. The method may include sensing the user initiated touch via an electrode layer laid beneath a transparent touch screen having form lines laying in a same direction under the transparent touch screen, and sensing the user initiated touch via an actuator layer laid beneath the electrode layer by providing a tactile surface responsive to the user initiated touch. Another example embodiment of the present invention may include a user initiated touch sensitive apparatus. The apparatus may include an electrode layer laid beneath a transparent touch screen and configured to sense the user initiated touch via form lines laying in a same direction under the transparent touch screen. The apparatus may also include an actuator layer laid beneath the electrode layer and configured to sense the user initiated touch and provide a tactile surface responsive to the user initiated touch.

DETAILED DESCRIPTION OF THE INVENTION

The present invention provides a module or system and a method that includes: 1) a transparent screen assembly containing an actuator layer lying between two layers of transparent multiple line electrodes, where one electrode layer of forms lines in the x-direction layer and the other electrode layer forms lines in the y-direction; and 2) a controller that is connected to these electrodes. The system and method of the present invention provides: 1) multiple touch sensing on or near a surface of the transparent screen and 2) simultaneous high resolution tactile feedback across the same surface.

Figure 1A:
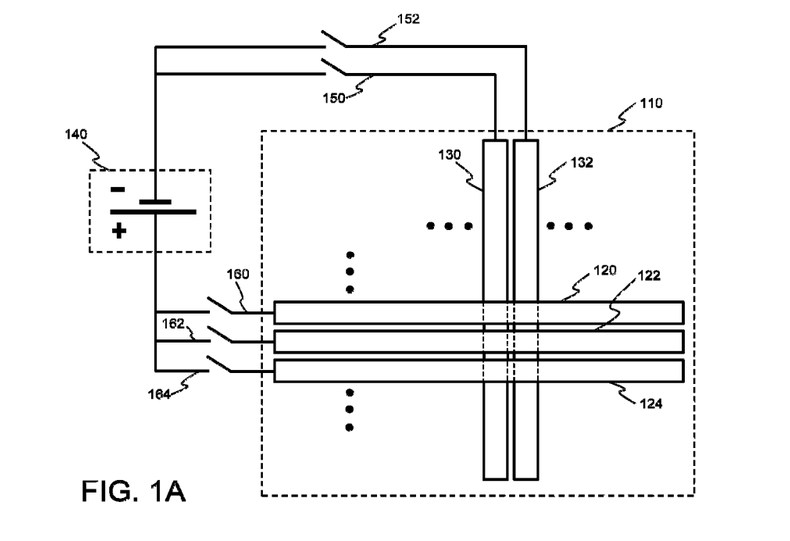
FIG. 1A depicts an example implementation of a two layer, orthogonal electrode line grid with a battery that can be connected between the electrodes of the two layers.

FIG. 1A depicts an example implementation of a two layer, orthogonal line electrode grid assembly 110 with a battery 140 that can be connected between the electrodes of the two layers in accordance to an embodiment of the present invention. As shown, the y-direction line electrodes 130 and 132 are on the bottom layer and the x-direction line electrodes, 120, 122 and 124, are on the top layer. The line electrodes may be individually connected to the battery 140 by means of the switchable connections 150 and 152 for the y-direction electrodes and switchable connections 160, 162 and 164 for the upper x-direction electrodes. The ellipses in FIG. 1A indicate there may be many electrodes, in both the x and y directions. For the touch screen application of the present invention the electrode grid assembly should be transparent.

A touch screen may contain a transparent conductor pattern consisting of 10 columns of 1 millimeter (mm) wide indium tin oxide (ITO) spaced 5 mm apart on one side of a glass sheet and 15 rows of 5 mm high ITO with 37 micrometer (μm) deletions between them on the other side. The space between the 10 columns is filled with unconnected ITO in order to maintain uniform optical appearance.

The shape details of the line electrodes in the present invention are not restricted to the plain line shapes drawn in FIG. 1A. For example, line electrodes designed with the "line of diamonds" pattern are well known to those skilled in the art of touch screens and can also be used here. In general, it is desirable for the line electrodes to be designed with a linear pattern that optimizes the performance of the touch screen.

In the present invention, the orthogonal line electrodes, e.g. 120 and 130, can be ITO electrodes but in some embodiments are preferably formed from a transparent carbon nanotube composite coating or structure.

SWNT and SWCNT are acronyms for "single walled carbon nanotube" molecular structures; as opposed to MWNT and MWCNT which are acronyms for "multiple walled carbon nanotube" molecular structures. Most single-walled nanotubes (SWNT) have a diameter of close to 1 nanometer, with a tube length that can be many millions of times longer. Carbon nanotubes are highly anisotropic with axial properties very different than trans-axial properties and can have the highest tensile strength and the highest axial electrical and thermal conductivities. If they are constructed slightly differently, i.e., different carbon bond angles on the tube surface relative to the tube axis, carbon nanotubes are semiconductors instead of metallic conductors.

In the present invention, the orthogonal line electrode grid assembly 110 has electrodes that may be composed of transparent carbon nanotube material instead of the traditional indium tin oxide (ITO) material. ITO is widely used for transparent electrode assemblies in touch screens and display technologies including liquid crystal displays (LCD)

and plasma displays. Carbon nanotube electrodes may be preferred in embodiments of the present invention where the electrodes are used as part of, to integrate into, or at least interface with, a carbon nanotube based actuator. Note that in the present invention, this actuator electrode function is in addition to the use of the electrodes as traditional capacitive sensors in the manner required for multi-touch detection.

Figure 1B:
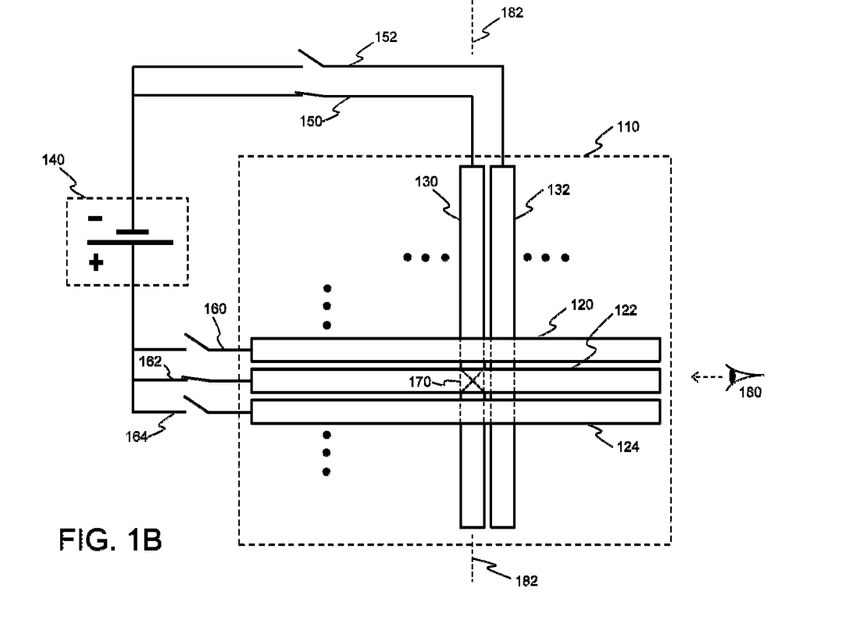
FIG. 1B depicts an example implementation of a two layer, orthogonal electrode line grid with a battery that is connected between two line electrodes, one on each of the two layers.

FIG. 1B depicts the orthogonal line electrode grid assembly 110 under the condition that the y-direction line electrode 130 has been connected to the negative terminal of battery 140 by switch closure on conductor/connector 150 and the x-direction line electrode 122 has been connected to the positive terminal of battery 140 by switch closure on conductor/connector 162. This results in an electrical field between electrodes 122 and 130 at the square 170 that is defined by the intersection of these two electrodes as viewed from above and is indicated by an "X" in FIG. 1B.

Figure 2A:
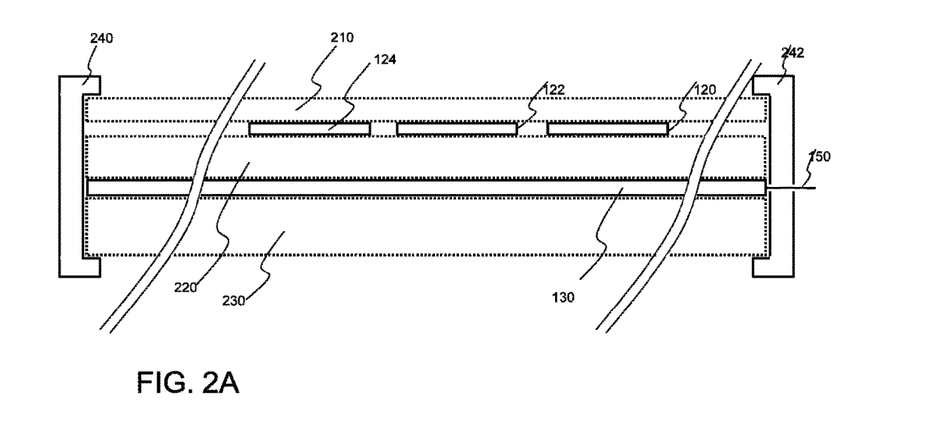
FIG. 2A depicts a side view of an assembly that contains a two layer, orthogonal electrode line grid of FIG. 1A with an inactive actuator layer between the electrode layers in accordance to an embodiment of the present invention.
Figure 2B:
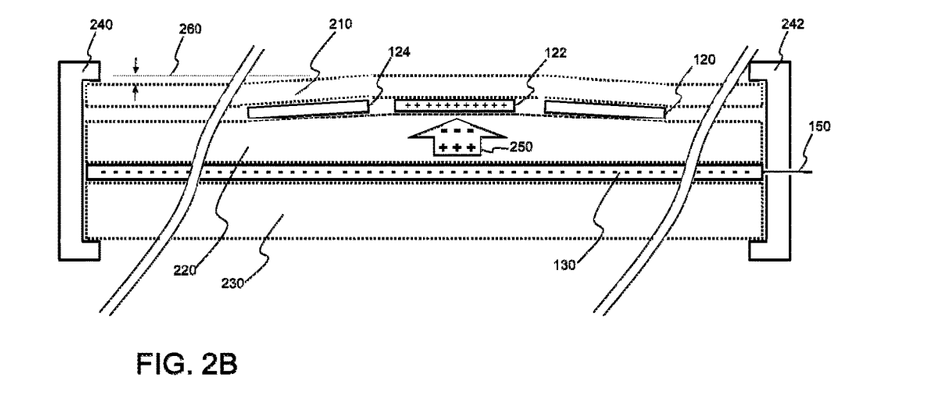
FIG. 2B depicts a side view of an assembly that contains a two layer, orthogonal electrode line grid of FIG. 1B with an activated actuator layer between the electrode layers in accordance to an embodiment of the present invention.
Figure 2C:
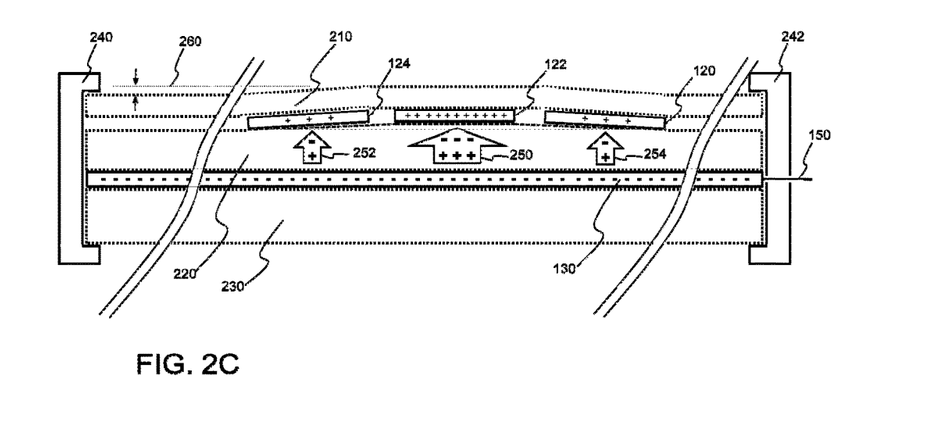
FIG. 2C depicts a side view of the assembly that contains a two layer, orthogonal electrode line grid with an activated actuator layer between the electrode layers and an activation voltage profile along the upper electrode layer in accordance to an embodiment of the present invention.

FIGS. 2A, 2B and 2C depict cross-sectional views of an example touch screen embodiment of the present invention. Relative to the electrode grid assembly of FIGS. 1A and 1B, this cross-sectional view is defined by the view of the eye 180 in FIG. 1B toward the components of the example touch screen embodiment along a plane that contains line 182 in FIG. 1B and is normal to the x and y directions of the line electrode grid.

FIG. 2A depicts a cross-sectional view of an example touch screen embodiment of the present invention and shows cross-sections of lower y-direction line electrode 130, and the upper x-direction electrodes 120, 122 and 124. FIG. 2A also shows the upward projecting display unit 230, which provides a hard and fixed support surface for the lower y-direction electrodes. FIG. 2A also shows a flexible, transparent top surface 210 that rests on, is stretched over, or is attached to, the upper x-direction electrodes. FIG. 2A also shows a touch screen and display enclosure support 240 and 242, wherein 242 is shown as providing an access path or hole for the connecting conductor (wire) 150 to the lower y-direction electrode 130.

In the example touch screen embodiment of the present invention diagrammed in FIG. 2A, the lower y-direction line electrodes, e.g., electrode 130, and the upper x-direction electrodes, e.g., 120, 122 and 124, are separated by material layer 220 which is a transparent, multiple electrode actuator assembly. In a preferred embodiment, multiple electrode actuator assembly 220 is a transparent composite assembly of carbon nanotubes.

In an example preferred embodiment, the transparent, multiple electrode, carbon nanotube composite actuator assembly 220 is based on a dry SWNT-Nafion composite. The present invention anticipates further development in the field of transparent, macro-scale carbon nanotube actuators, e.g., actuators that do not use Nafion, and includes all such developments in the intended embodiments.

The present invention also includes embodiments that use transparent piezoelectric composites for the transparent, multiple electrode actuator assembly 220.

FIG. 2B depicts a cross-sectional view of an example touch screen embodiment of the present invention wherein the y-direction electrode 130 and x-direction line electrode 162 are connected to the battery 140 as in indicated in FIG. 1B. These connections result in an electrical field between electrodes 122 and 130 and the electric field stimulates a local actuator response 252 in the example transparent, multiple electrode, and carbon nanotube composite actuator assembly 220. Given the hard and fixed support surface provided by the display unit 230 and the flexible top surface 210, the local actuation response 252 locally raises the surface 210 of the touch screen by a displacement indicated by the arrows and the displacement line 260. In the present invention this electrode-activated local displacement provides the touch screen a means of providing tactile feedback.

FIG. 2C depicts a cross-sectional view of an example touch screen embodiment of the present invention wherein all three of the illustrated x-direction line electrodes, 160, 162 and 164, are activated to produce the displacement indicated by the arrows and the displacement line 260. For the purpose of illustration, the local actuation response is shown as being composed of three individual responses, 250, 252 and 254. This example depicts the general requirement, according to the present invention, of a multiple electrode activation profile that drives the multiple electrode actuator assembly 220 so that it produces a desired multiple x-y coordinate displacement profile on the surface of the touch screen.

Figure 3:
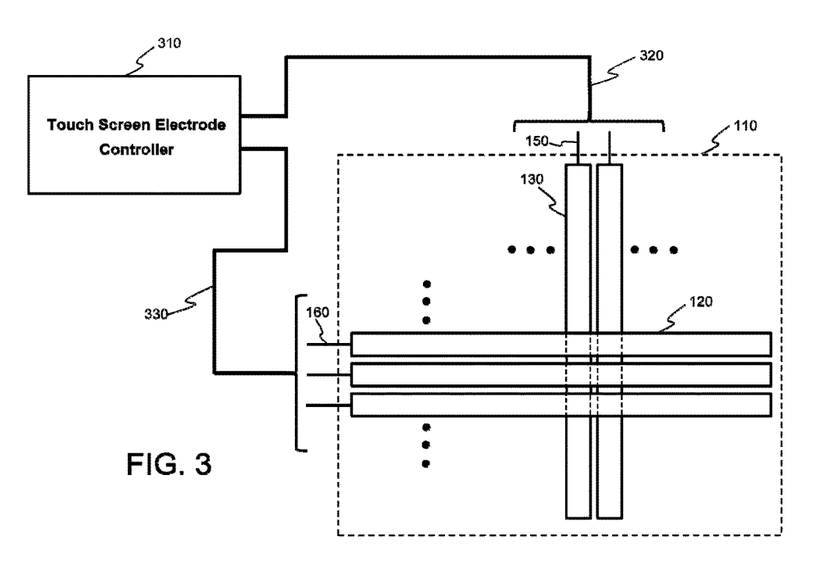
FIG. 3 depicts an electrode controller and a top view of the assembly that contains the two layer, orthogonal electrode line grid in accordance to an embodiment of the present invention.

FIG. 3 shows a diagram of an embodiment of the present invention which contains a multi-touch sensing and tactile feedback screen controller system or module 310 that is electrically connected to each of the lower y-direction electrodes via connector assembly 320 and each of the upper x-direction electrodes via connector assembly 330. One function of the multi-touch sensing and tactile feedback screen controller module 310 in the present invention is to provide the x and y electrodes of the orthogonal line electrode grid assembly 110 with the electrode activation profile that drives the multiple electrode actuator assembly 220 to produce a desired multiple x-y coordinate displacement profile on the surface of the touch screen. A second desired function of the multi-touch sensing and tactile feedback screen controller module 310 in the present invention is to use the x and y electrodes of an orthogonal line electrode grid assembly to provide a sensing capability for multiple touch user input to the device containing the touch screen of the invention.

It is well known that the projected, mutual capacitance technique can provide multiple touch sensing using an electrode grid assembly, for example assembly 110.

Figure 4:
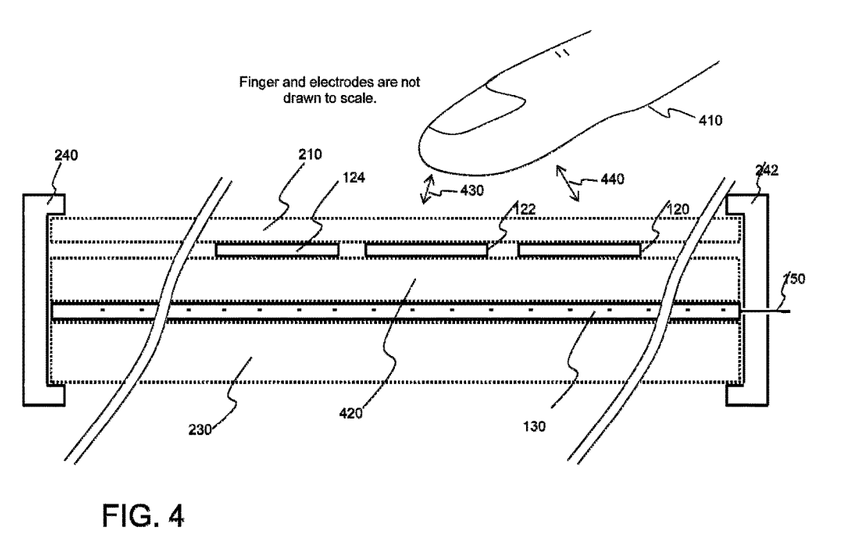
FIG. 4 depicts a side view of an assembly that contains a two layer, orthogonal electrode line grid with a dielectric layer between the electrode layers in accordance with prior art mutual capacitance multi-touch sensor technology.

FIG. 4 depicts a cross-sectional view of an example touch screen wherein the nearby presence of a finger 410 is being sensed using the mutual projected capacitance technique. In FIG. 4 the layer 420 between the lower y-direction line electrodes, e.g., 130, and the upper x-direction electrodes, e.g., 160, 162 and 164, is a dielectric (insulator) such as a suitable glass or plastic. The dielectric layer 420 and the electrode line grid assembly 110 (see FIG. 3) create a matrix of x-y electrode pair mutual capacitances $C_{x,y}$ which are approximately equal in the absence of the finger and, most importantly, decrease in the nearby presence of the finger allowing the location of the finger 410 to be sensed. Excitation of individual lower y-direction electrode 130 results in an electric field induced charge in the upper x-direction electrodes. The induced charge is lessened in the x-direction electrodes that are near the finger since a finger is an effective grounding object that lessens the electric field connecting the x and y electrodes. The finger's lessening of the induced electric charge on 'sensing' electrodes 120 and 122 is indicated by the sensing arrows 430 and 420, respectively. This mutual capacitance technique can detect multiple simultaneous finger touches (i.e., more than one finger) since induced charges are measured for all of the x electrodes when each individual y electrode is activated; the process being repeated until all y electrodes have been activated. This produces an independent x-y coordinate sensing capability.

Figure 5:
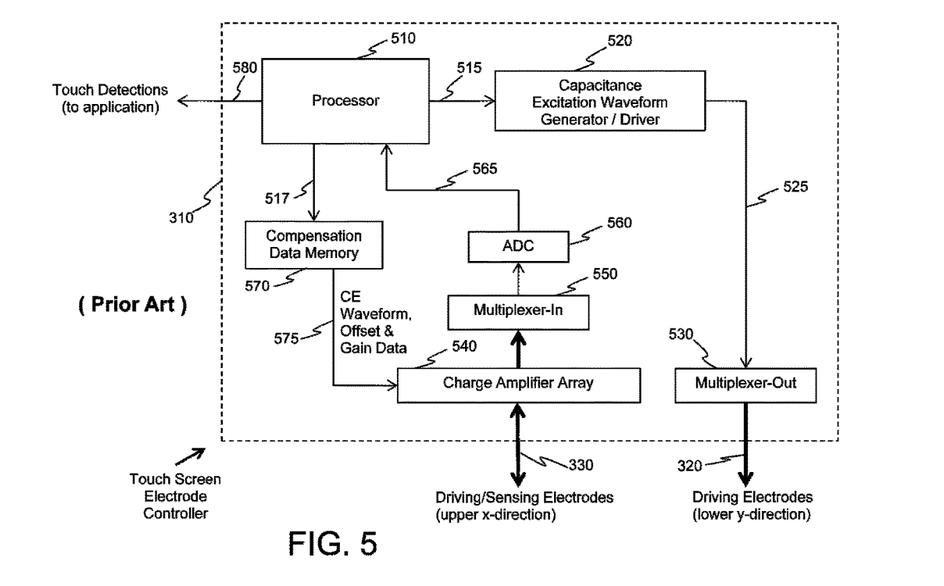
FIG. 5 depicts a block diagram of certain processes performed by a touch screen controller in accordance with prior art mutual capacitance multi-touch sensor technology.

FIG. 5 is a block diagram of certain processes performed by known example embodiments of a touch screen electrode controller capable of detecting multiple touches using the electrode line grid assembly 110 depicted in FIGS. 3 and 4. The controller contains a processor 510 which provides control signals and a capacitance-sensing excitation waveform data 515 to a capacitance-sensing excitation waveform generator/driver circuitry 520, which provides a low impedance output 525 to a multiplex-out module 520. The multiplex-out module 520 connects via an output connection assembly 320 to the plurality of lower y-direction, driving electrodes which are sequentially driven with the excitation waveform. An excited lower y electrode, e.g., electrode 130 in FIG. 4, induces charge in each of the upper x-direction sensing electrodes, e.g., 160, 162 and 164 due to the presence of an x-y electrode pair mutual capacitance $C_{x,y}$. These induced charges are converted to voltages by the charge amplifier array 530 which has as one amplifier channel for each x-direction sensing electrode. The voltage output of the entire charge amplifier array 540 may be simultaneously sampled and then sequentially multiplexed 550 into an analog-to-digital converter (ADC) 560 which provides a digitized sample 565, for each x sensing electrode (snapshot of the sensing x-electrodes) to the processor 510. The capacitance excitation driver 520 and the multiplexer-out 530 then excite the next y driving electrode and the snapshot of the x sensing electrodes is repeated; until all of the y electrodes have been excited. At this point the processor has received mutual-capacitance-induced-charge measurements for all x-y coordinates of the electrode line grid assembly 110. The presence of a finger near an x-y coordinate is indicated by a change in the induced-charge measurement at that coordinate. The processor executes signal/image processing algorithms that enhance the induced-charge measurement data to detect multiple touch events and gestures of interest and to report these touch detections 580 to the host application.

Figure 6:
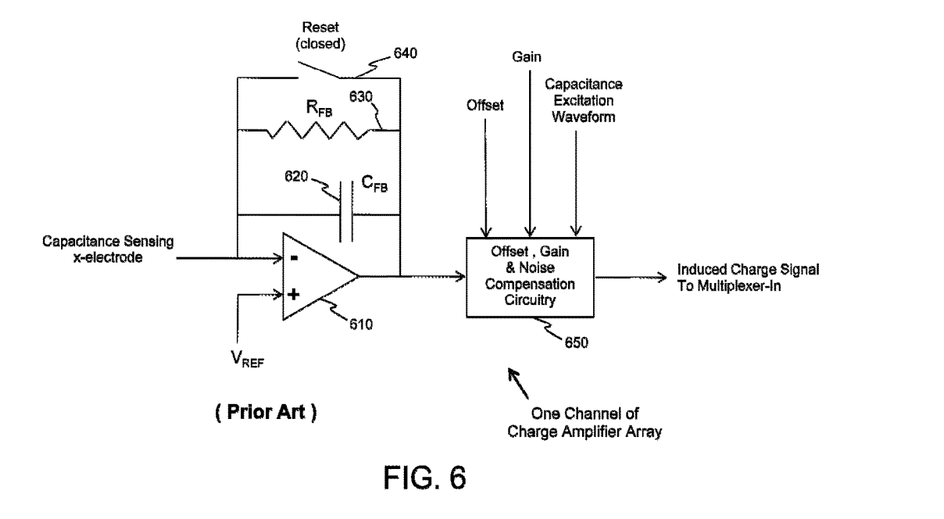
FIG. 6 depicts a diagram of an example embodiment of an individual channel in the charge amplifier array of a touch screen controller in accordance with prior art mutual capacitance multi-touch sensor technology.

FIG. 6 is a diagram of an example embodiment of an individual charge amplifier channel in the charge amplifier array 540 according to known prior art. The operational amplifier 610 has a feedback capacitor $C_{FB}$ 620 that determines a charge-to-voltage gain as the ratio of $C_{x,y}$ to $C_{FB}$ and a feedback resistor $R_{FB}$ 630 that determines the direct current (d.c.) input resistance and allows the operational amplifier to hold d.c. voltage of the input to $V_{REF}$. The inverse product of $R_{FB}$ and $C_{FB}$ determines the corner frequency of the amplifier's filter characteristic. The reference voltage $V_{REF}$ may be set to zero to reduce the effects of stray capacitances to ground. Feedback resistor $R_{FB}$ 630 is omitted in some embodiments with the closing the reset switch 640 between scans providing a unity-gain amplifier that clears the induced charges in Cx,y from the last measurement. Various implementations of analog circuitry 650 are known that provide driver-electrode-dependent gain and offset compensation and that use the capacitance excitation (CE) waveform to improve the signal-to-noise ratio of the output to the multiplexer-in module 550.

Figure 7:
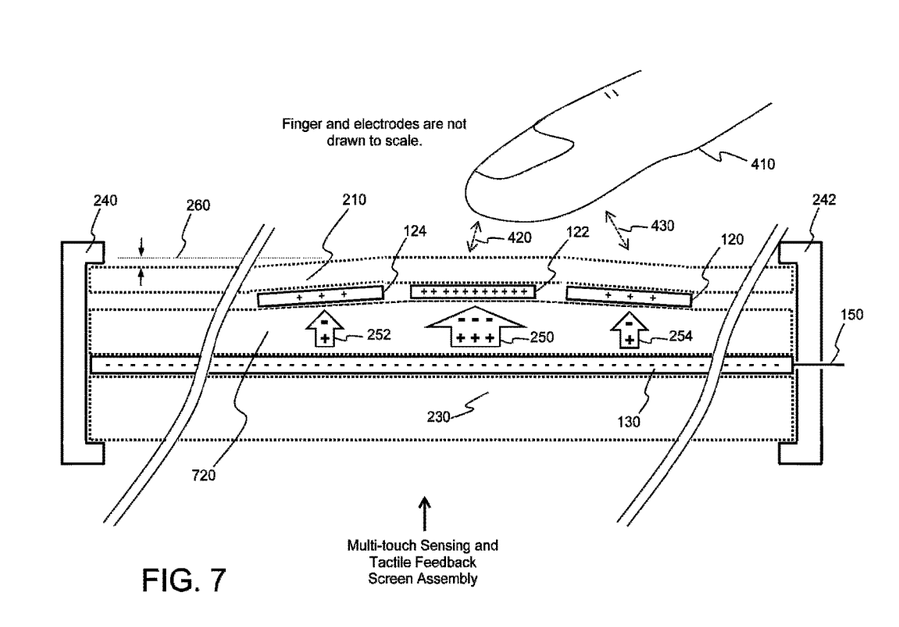
FIG. 7 depicts a side view of an assembly that contains a two layer, orthogonal electrode line grid with an activated actuator layer between the electrode layers in accordance with an embodiment of the multiple touch and tactile feedback system of the present invention.

FIG. 7 depicts a cross-sectional view of an example touch screen that is a preferred embodiment of the present invention wherein the multiple electrode actuator assembly 720 is a transparent assembly of carbon nanotube composites. The carbon nanotube actuators are capacitors with an electrolyte dielectric matrix. The multiple electrode carbon nanotube actuator/capacitor assembly 720 together with a novel touch and tactile electrode controller allows the same electrode line grid assembly 110 (see FIG. 3) to: 1) sense nearby fingers using the above mutual capacitance technique and 2) simultaneously produce high resolution, local tactile feedback using the above multiple electrode actuator technique.

Figure 8:
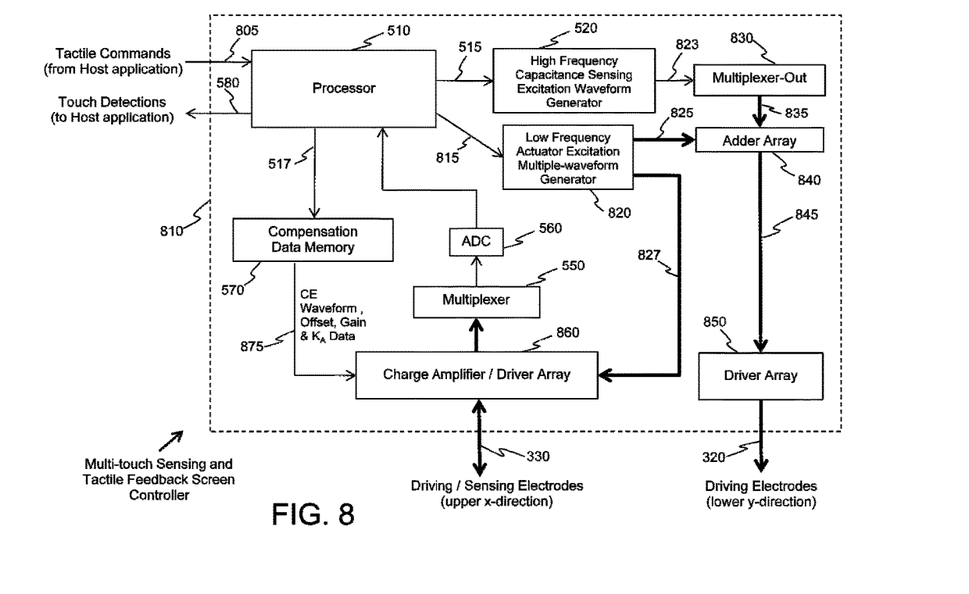
FIG. 8 depicts a block diagram of certain processes performed by a multi-touch sensing and tactile feedback screen controller in accordance with an embodiment of the multiple touch and tactile feedback system of the present invention.

FIG. 8 is a block diagram of certain processes performed by an example embodiment of the present invention of a multi-touch sensing and tactile feedback screen controller 810 that is capable of both detecting multiple touches and providing local tactile feedback using the electrode line grid assembly 110 depicted in FIG. 3 and the multiple electrode carbon nanotube actuator assembly 720 in FIG. 7. The processor 510 receives tactile commands 805 from and provides touch detections 580 to a host processor application. The processor 510 also provides control signals and a high frequency capacitance-sensing excitation waveform data 515 to the high frequency capacitance-sensing excitation waveform generator 520. The processor 510 also provides control signals and low frequency actuator excitation waveform data 815 to the low frequency actuator excitation multiple-waveform generator 820. To generate a desired tactile surface given a set of tactile commands 805, there is generally a plurality of actuator excitation waveforms required to drive a plurality of lower y-electrodes and a plurality of actuator excitation waveforms required to drive a plurality of upper x-electrodes.

In a preferred embodiment of the multi-touch sensing and tactile feedback screen controller 810 in FIG. 8, the frequency domain spectral power densities of the high frequency capacitance-sensing excitation waveform and the low frequency actuator excitation waveforms do not overlap. This driving-waveform-frequency-separation condition greatly simplifies the signal processing that is required to extract the touch-sensing capacitative-coupling signals on all x-electrode connections in connection assembly 330. These signals are in response to the capacitance driving signal that is sequentially imposed on individual y-electrodes in connection assembly 320. The signal processing that is required for the touch-sensing capacitative-coupling signals on the x-electrodes must take into account that any number of x-electrodes and any number of y-electrodes are being driven with actuator excitation waveforms. In an example preferred embodiment, a driving-waveform-frequency-separation condition restricts the high frequency capacitance-sensing excitation waveform to frequencies above 100,000 Hertz (100 KHz); a condition that is known to be feasible to those skilled in the art of mutual capacitance touch sensing measurements for touch screen devices. An example high frequency capacitance-sensing excitation waveform that has frequency components above 100 KHz is an infinite train of 50% duty cycle pulses where the time between the leading edge of adjacent pulses is ½₀₀ KHz or 5 microseconds. Restricting this pulse train to at least 10 pulses provides an acceptable approximation to the driving-waveform-frequency-separation condition of the present invention. Those skilled in the art know that other high-frequency-only pulse waveforms such as pseudo-random pulse sequences can be used to support signal enhancement techniques, such as cross-correlation of the response and driving signals. Given the actuator response times are generally slower than 1 millisecond; it follows that the actuator excitation driving waveforms can occupy frequencies below 10 KHz, which together with above pulse train example of an above 100 KHz capacitance excitation waveform, indicates that the proposed driving-waveform-frequency-separation condition of the present invention can be readily achieved in practice.

Referring to FIG. 8, the capacitance-sensing excitation waveform signal 823 is input to a multiplexer-out module 830 which connects the signal to one of the y-electrode signal paths 835 that are output from the multiplexer-out module 830 and input to the adder array 840. The other input to the adder array 840 is the actuator excitation signals 835 for the y-electrodes that are output from the actuator excitation multiple-waveform generator 820. The array adder 840 can be described as a vector summing module where the input vectors are the analog signal busses 825 and 835, the output vector is the analog signal bus 845, and the elements of the vectors are defined by the individual, corresponding y-electrode signals in each analog signal bus. The y-electrode signals in analog signal bus 845 are input to the driver array 850 which contains as many driver amplifier channels as there are y-electrodes with each amplifier being connected to a y-electrode via the output connection/wiring assembly 320. The actuator excitation multiple-waveform generator 820 also outputs the x-electrode actuator excitation signals 827 that are received by the charge amplifier/driver array 860.

Figure 9:
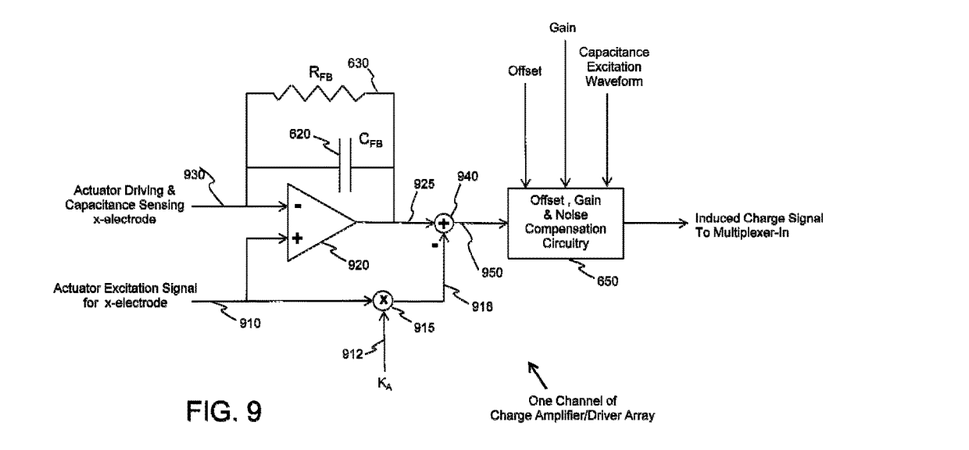
FIG. 9 depicts a diagram of an example embodiment of an individual channel in the charge amplifier/driver array of a multi-touch sensing and tactile feedback screen controller in accordance with an embodiment of the multiple touch and tactile feedback system of the present invention.

FIG. 9 is a diagram of an example embodiment of the present invention of an individual charge amplifier/driver channel in the charge amplifier/driver array 860. By connecting the x-electrode actuator excitation signal 910 to the positive input of the operational amplifier 920 the x-electrode can be driven with the actuator signal at frequencies below the feedback RC characteristic frequency of $F_c=2*\pi/(R_{FB}*C_{FB})$. For example, $F_c$ can be on the order of 10 KHz, based on the above discussion of example capacitance excitation and actuator excitation waveforms. Compared to the operational amplifier 610 in FIG. 6, the operational amplifier 920 has an additional output power requirement that allows it to drive the x-electrode. This operational amplifier output requirement should be consistent with the driving requirements of the multiple electrode carbon nanotube actuator/capacitor assembly 720 in FIG. 7. The touch-sensing induced-charge signal of interest 950 is obtained by subtracting 940 a scale adjusted actuator excitation signal 918 from the output 925 of the operational amplifier 920. A multiplier 915 scales the actuator excitation signal 910 by the actuation compensation parameter $K_A$ 912 that is provided by the processor 510 for that particular x and y electrode combination. $K_A$ compensates for the changes in low frequency y-to-x electrode impedance with changes in the level of local actuator activation. As discussed earlier, known analog circuitry 650 can provide gain and offset compensation and use the capacitance excitation (CE) waveform to improve the signal-to-noise ratio of the induced-charge measurement that is output to the multiplexer-in module 550 in FIG. 8.

Figure 10:
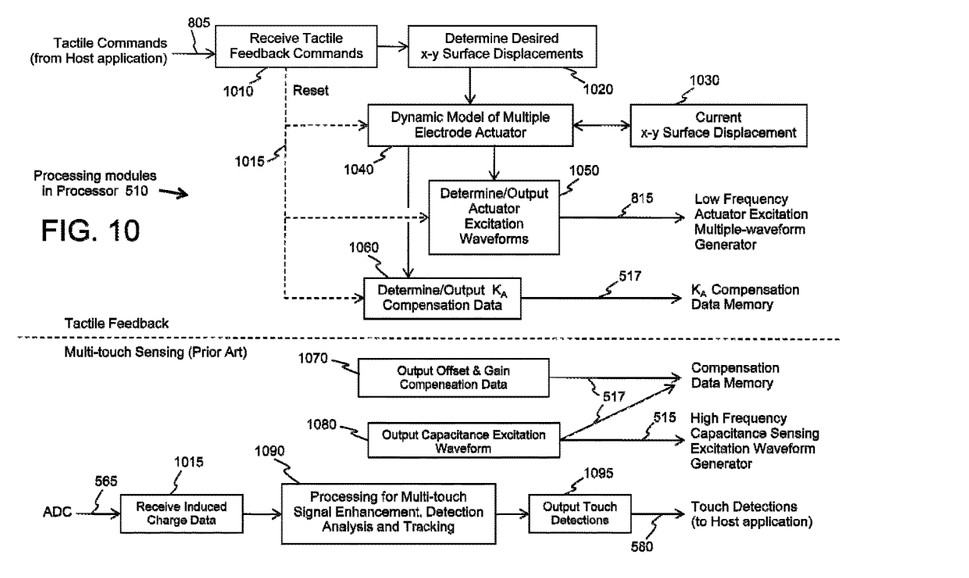
FIG. 10 shows a diagram of certain processes performed by an example implementation of the processor in the multi-touch sensing and tactile feedback screen controller of the present invention.

FIG. 10 shows a diagram of certain processes that are performed by an example implementation of processor 510 of the multi-touch sensing and tactile feedback screen controller 810 of FIG. 8 that controls the multi-touch sensing and tactile feedback assembly of FIG. 7, all of which are of the present invention. The frequency separation of the capacitance-sensing excitation signal and the actuator excitation signals, from waveform generators, 520 and 820, respectively, together with the design of the charge amplifier/driver array 860 has the result that the touch-sensing and tactile-feedback software processing modules in processor 510 are separable, i.e., they can operate independently of each other, as shown in FIG. 10. This independence is highly desirable since it means the new tactile feedback processing can simply be added to the processor 510, while retaining existing prior art processing for multi-touch sensing which typically has already been reduced to practice and performance optimized.

Referring to FIG. 10, according to the present invention, the processor receives 1010 tactile commands 805 from a host processor software application and determines the desired series of x-y surface displacements 1020 that satisfy the tactile command, where the displacement refers to the z-axis orthogonal to the x-y surface of the screen assembly. The desired x-y surface displacements 1020 and the current x-y surface displacement 1030 and are input to a dynamic model of the multiple-electrode actuator 1040. The dynamic model of the multiple electrode actuator 1040 is used to determine the series of actuator excitation waveforms 1050 that will produce these displacements, using, for example, numerical inversion techniques of applied control theory. The actuator excitation waveforms are output 815 to the low frequency actuator-excitation, multiple-waveform generator 820. The x-y dependent $K_A$ compensation parameters for the charge amplifier/driver array 860 are determined 1060 based on the state of the dynamic model 1040. Note the $K_A$ compensation data may in general vary with the x-y coordinate and time because it is dependent on the state of the multiple-electrode actuator as expressed in the dynamic model 1040. The processor 510 outputs the $K_A$ compensation data to the compensation data memory 570. The dynamic model 1040, the actuator waveforms 1050 and the $K_A$ compensation data 1060 can preferably be reset to a known 'flat surface' state using a reset command 1015 from the host processor application. The 'flat surface' reset command 1015 mitigates errors in the tactile feedback that may accumulate due to modeling errors in the dynamic model of the multiple electrode actuator 1040.

Referring to FIG. 10, the processor can receive induced charge data 1015 from the ADC 560 that is x-y coordinate indexed and perform processing that includes multi-touch signal enhancement, detection and tracking 1090 and output the resultant touch detection information 1095 to the host software application(s). The capacitance excitation waveform data is output 1080 to the high frequency capacitance-sensing excitation waveform generator 520 and to the compensation data memory 570 of FIG. 9. The offset and gain compensation data is also output 1070 to the compensation data memory 570.

What is claimed is:

1. A method of detecting user initiated touch, the method comprising;
    sensing the user initiated touch via an electrode layer laid beneath a transparent touch screen having form lines laying in a same direction under the transparent touch screen and wherein the electrode layer comprises a plurality of electrodes laid in an x-axis direction;
    sensing the user initiated touch via an actuator layer laid beneath the electrode layer; sensing the user initiated touch via another electrode layer, the another electrode layer being laid beneath the actuator layer and comprising electrodes laid in a y-axis direction with respect to the x-axis direction;
    detecting the user initiated touch via a mutual capacitive detection and a multiple electrode actuation detection;
    providing touch detections to a host application from a processor based on at least one tactile command received and receiving tactile commands from the host application at the processor;
    providing high frequency capacitance-sensing excitation waveform data from the processor to a high frequency capacitance-sensing excitation waveform generator;
    providing control signals and low frequency actuator excitation waveform data from the processor to a low frequency actuator excitation multiple-waveform generator that is separate from the high frequency capacitance-sensing excitation waveform generator, and wherein the high frequency capacitance-sensing excitation waveform data and the low frequency actuator excitation waveform data are both provided for driving the y-axis direction electrodes;

receiving an increased amount of electrical charge at one or more electrodes of the electrode layer at a location directly beneath where the user initiated touch was sensed, wherein the increased amount of electrical charge is received from the another electrode layer in response to the at least one tactile command; and providing a tactile surface responsive to the user initiated touch by locally raising a surface of the touch screen only at a position where the user initiated touch occurred responsive to receiving the increased amount of electrical charge and responsive to the at least one tactile command.

2. The method of claim 1, wherein the another electrode layer comprises form lines laid in a direction perpendicular to the form lines of the electrode layer.

3. The method of claim 1, wherein the actuator layer comprises a transparent assembly of carbon nanotube composites.

4. The method of claim 2, further comprising:

providing an electrical field between the electrode layer and the another electrode layer which stimulates a local actuator response in the actuator layer via a battery connected to the electrode layer and the another electrode layer.

5. The method of claim 1, further comprising:

generating high frequency data based on the electrode layer response to the user initiated touch and low frequency data based on the actuator layer response to the user initiated touch.

6. A user initiated touch sensitive apparatus comprising:

an electrode layer laid beneath a transparent touch screen and wherein the electrode layer comprises a plurality of electrodes laid in an x-axis direction;

a processor configured to sense the user initiated touch via form lines laying in a same direction under the transparent touch screen, sense the user initiated touch via another electrode layer, the another electrode layer being laid beneath the actuator layer and comprising electrodes laid in a y-axis direction with respect to the x-axis direction;

a controller connected to the electrode layer and the another electrode layer and being configured to detect the user initiated touch via a mutual capacitive detection and a multiple electrode actuation detection, provide touch detections to a host application based on at least one tactile command received, receive tactile commands from the host application, provide high frequency capacitance-sensing excitation waveform data to a high frequency capacitance-sensing excitation waveform generator, and provide control signals and low frequency actuator excitation waveform data to a low frequency actuator excitation multiple-waveform generator that is separate from the high frequency capacitance-sensing excitation waveform generator, and wherein the high frequency capacitance-sensing excitation waveform data and the low frequency actuator excitation waveform data, are both provided for driving the y-axis direction electrodes;

a receiver configured to receive an increased amount of electrical charge at one or more electrodes of the electrode layer at a location directly beneath where the user initiated touch was sensed, wherein the increased amount of electrical charge is received from the another electrode layer in response to the at least one tactile command from the controller, an actuator layer laid beneath the electrode layer and configured to sense the user initiated touch and provide a tactile surface responsive to the user initiated touch by locally raising a surface of the touch screen only at a position where the user initiated touch occurred and responsive to the at least one tactile command from the controller; and wherein the processor is configured to receive touch detection measurements based on the user initiated touch, the processor being further configured to generate high frequency data and provide the high frequency data to the high frequency capacitance-sensing excitation waveform generator and generate low frequency data and provide the low frequency data to the low frequency actuator excitation waveform generator.

7. The apparatus of claim 6, wherein the another electrode layer is configured to sense the user initiated touch via form lines laid in a direction perpendicular to the form lines of the electrode layer.

8. The apparatus of claim 6, wherein the actuator layer comprises a transparent assembly of carbon nanotube composites.

9. The apparatus of claim 7, further comprising:

a battery connected to the electrode layer and the another electrode layer, the battery providing an electrical field between the electrode layer and the another electrode layer which stimulates a local actuator response in the actuator layer.

10. The apparatus of claim 6, wherein the processor is further configured to generate the high frequency data based on the electrode layer response to the user initiated touch and generate the low frequency data based on the actuator layer response to the user initiated touch.

11. A non-transitory computer readable storage medium configured to store instructions that when executed cause a processor to perform detecting user initiated touch, the processor being further configured to perform:

sensing the user initiated touch via an electrode layer laid beneath a transparent touch screen having form lines laying in a same direction under the transparent touch screen and wherein the electrode layer comprises a plurality of electrodes laid in an x-axis direction;

sensing the user initiated touch via an actuator layer laid beneath the electrode layer;

sensing the user initiated touch via another electrode layer, the another electrode layer being laid beneath the actuator layer and comprising electrodes laid in a y-axis direction with respect to the x-axis direction:

providing touch detections to a host application from a processor based on at least one tactile command received and receiving tactile commands from the host application at the processor;

providing high frequency capacitance-sensing excitation waveform data from the processor to a high frequency capacitance-sensing excitation waveform generator;

providing control signals and low frequency actuator excitation waveform data from the processor to a low frequency actuator excitation multi pie-waveform generator that is separate from the high frequency capacitance-sensing excitation waveform generator, and wherein the high frequency capacitance-sensing excitation waveform data and the low frequency actuator excitation waveform data are both provided for driving the y-axis direction electrodes;

detecting the user initiated touch via a mutual capacitive detection and a multiple electrode actuation detection;

receiving an increased amount of electrical charge at one or more electrodes of the electrode layer at a location directly beneath where the user initiated touch was sensed, wherein the increased amount of electrical charge is received from the another electrode layer in response to the at least one tactile command; and providing a tactile surface responsive to the user initiated touch by locally raising a surface of the touch screen only at a position where the user initiated touch occurred and responsive to the at least one tactile command.

12. The non-transitory computer readable storage medium of claim 11, wherein the another electrode layer comprises form lines laid in a direction perpendicular to the form lines of the electrode layer.

13. The non-transitory computer readable storage medium of claim 11, wherein the actuator layer comprises a transparent assembly of carbon nanotube composites.

14. The non-transitory computer readable storage medium of claim 12, wherein the processor is further configured to perform:

providing an electrical field between the electrode layer and the another electrode layer which stimulates a local actuator response in the actuator layer via a battery connected to the electrode layer and the another electrode layer.

\* \* \* \* \*